UNITED STATES PATENT OFFICE.

CARL CHRISTIAN LEOPOLD GETHER BUDDE, OF COPENHAGEN, DENMARK, ASSIGNOR TO SÖREN LEMVIG FOG AND AAGE GEORG KIRSCHNER, OF SAME PLACE.

MATCH.

SPECIFICATION forming part of Letters Patent No. 676,874, dated June 25, 1901.

Application filed January 19, 1900. Serial No. 1,964. (No specimens.)

*To all whom it may concern:*

Be it known that I, CARL CHRISTIAN LEOPOLD GETHER BUDDE, a subject of the King of Denmark, residing at Copenhagen, in the Kingdom of Denmark, have invented certain new and useful Improvements in Matches, (for which I have applied for a patent in Germany, dated December 11, 1899; in Denmark, dated December 18, 1899, and in France, dated December 27, 1899,) of which the following is a specification.

Repeated attempts have been made to render the use of phosphorus unnecessary in the manufacture of matches. Most of the matches that are said to be made without phosphorus do indeed contain the so-called "red" or "amorphous" phosphorus, or a prepared surface containing this red phosphorus is required for igniting them.

The object of the present invention is a match that does not contain any phosphorus and can be ignited on any surface.

By this invention a long-desired end is obtained—that is, the necessity of using phosphorus is entirely removed from the match-making industry. This desired end is obtained when a portion of the chlorate of the usual igniting composition containing chlorate of potassium or other chlorate of the alkali group and bichromate of potassium or other bichromate of a monovalent metal—such as bichromate of sodium, bichromate of ammonium, or the like—is replaced by the chlorate of a divalent or polyvalent metal—as, for example, chlorate of barium, chlorate of calcium, chlorate of strontium, or chlorate of lead.

In carrying out this invention two different courses may be taken:

First. A so-called "headless" match is made by dipping the wooden or other splint, previously impregnated with water, into a hot concentrated solution of the chlorate of a divalent or polyvalent metal. The object of impregnating the splints with water is to prevent the chlorate from rising higher in the same than the point to which they are dipped. The splints thus impregnated with the chlorate could be ignited by rubbing them on a prepared surface containing red phosphorus. The impregnated end of the splint is now covered by a thin skin or coating of some igniting composition which, besides the other constituent parts used for such purposes, must contain bichromate of potassium or other bichromate of the alkali group. When dry, a match is obtained that can be ignited on all surfaces—for example, on cloth, the wall, wood, or the like.

The purpose of the present invention is not obtained by using the chlorate of a metal of the alkali group instead of the chlorate of a divalent or polyvalent metal for impregnating the splints. It is, for example, of no use to impregnate the splints with potassium chlorate and to then apply the composition containing the bichromate to the impregnated end. This fact can be easily explained by the fact that in the chlorates of the metals of the alkali group (in which group the metals are without exception monovalent) the chloric acid is held much stronger than in the chlorates of the divalent or polyvalent metals—as, for example, the alkaline-earth group. With a chlorate of the alkaline-earth group or of some suitable metal—for example, chlorate of lead—the chloric acid is therefore much more easily separated than with a chlorate of the alkali group.

It has been found that of all salts the combination of chlorate of barium with bichromate of potassium is the best. The splints after being saturated with water are impregnated with chlorate of barium, and an igniting composition containing bichromate of potassium is then applied to the impregnated end. The following combination has proved to form a very suitable composition—viz., 24.5 parts chlorate of potassium, 9.6 parts sulfur, ten parts oxid of copper, five parts bichromate of potassium, and five parts glue or other adhesive. The various constituent parts can of course be varied. For example, chlorate of potassium can be wholly or partly replaced by chlorate of sodium, or instead of sulfur a sulfid of antimony may be used, and so on. When chlorate of sodium is used, a suitable agent—such as paraffin, resin, or such like—must be added in order to overcome its hygroscopic property.

By proceeding in the manner above described a match is obtained without a projecting ignition-head, as the igniting composition applied to the splint after it is impregnated with the chlorate need only be very thin.

Second. It is also possible to proceed by mixing the chlorate of the divalent or polyvalent metal with the igniting composition containing the bichromate of a monovalent metal and to dip the paraffined splints into this mass, which should further contain some adhesive.

What I claim, and desire to secure by Letters Patent of the United States, is—

1. An improved match, the ignition end of which is impregnated with chlorate of a metal of plural valence and coated with bichromate of a monovalent metal, substantially as set forth.

2. An improved match, the ignition end of which contains a halogen oxy salt of a divalent metal and bichromate of a monovalent metal, substantially as set forth.

3. An improved match, the ignition end of which contains chlorate of barium and bichromate of potassium, substantially as set forth.

4. An improved match, the ignition end of which contains chlorate of barium, chlorate of potassium, bichromate of potassium and oxid of copper, substantially as set forth.

5. An improved match, the ignition end of which is impregnated with a halogen oxy salt of a divalent metal and has a coating of igniting material, substantially as set forth.

6. An improved match, the ignition end of which is impregnated with chlorate of barium and has a coating of igniting material, substantially as set forth.

7. An improved match, the ignition end of which is impregnated with chlorate of barium and has a coating of material containing bichromate of potassium, sulfur, oxid of copper and an adhesive substance, substantially as set forth.

In testimony whereof I have hereunto set my hand in the presence of two witnesses.

CARL CHRISTIAN LEOPOLD GETHER BUDDE.

Witnesses:
  C. V. SCHON,
  JULES BLOM.